(12) United States Patent
Elliott et al.

(10) Patent No.: US 11,851,379 B2
(45) Date of Patent: Dec. 26, 2023

(54) SELECTIVE MASKING AND PLUGGING OF HONEYCOMB BODIES

(71) Applicant: CORNING INCORPORATED, Corning, NY (US)

(72) Inventors: Kevin Eugene Elliott, Horseheads, NY (US); Christina Marie Laskowski, Painted Post, NY (US); Michael George Shultz, Lowman, NY (US); John Christopher Thomas, Elmira, NY (US); Kevin Lee Wasson, Elmira, NY (US); Calvin Jay Winder, Cromwell, CT (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 17/257,390

(22) PCT Filed: Jun. 26, 2019

(86) PCT No.: PCT/US2019/039158
§ 371 (c)(1),
(2) Date: Dec. 31, 2020

(87) PCT Pub. No.: WO2020/009849
PCT Pub. Date: Jan. 9, 2020

(65) Prior Publication Data
US 2021/0179502 A1    Jun. 17, 2021

Related U.S. Application Data

(60) Provisional application No. 62/693,643, filed on Jul. 3, 2018.

(51) Int. Cl.
*C04B 38/00* (2006.01)
*B01D 46/00* (2022.01)
(Continued)

(52) U.S. Cl.
CPC ...... *C04B 38/0012* (2013.01); *B01D 46/0001* (2013.01); *B01J 20/28045* (2013.01); *C04B 41/0009* (2013.01)

(58) Field of Classification Search
CPC ............ C04B 38/0012; C04B 41/0009; B01D 46/0001; B01J 20/28045
See application file for complete search history.

(56) References Cited

U.S. PATENT DOCUMENTS 4,563,414 A * 1/1986 Ogawa ................... B01D 46/10
428/137
4,968,379 A * 11/1990 Doyle ....................... B05C 1/02
401/9

(Continued)

FOREIGN PATENT DOCUMENTS

AT        517049 A1   10/2016
CN      104810295 A    7/2015
(Continued)

OTHER PUBLICATIONS

Bayer et al., "UV-induced polymerization of highly filled epoxy resins in microelectronics", ACS Symposium Series, vol. 417, 1990, pp. 412-425.

(Continued)

*Primary Examiner* — Nathan H Empie
(74) *Attorney, Agent, or Firm* — Joseph M. Homa

(57) ABSTRACT

A method of plugging a honeycomb body is disclosed herein, the method comprising: contacting a first end of the honeycomb body comprising a plurality of channels with a light curable sealing mixture such that an infiltrate of the light curable sealing mixture flows into the plurality of channels proximate the first end; emitting a light toward a first portion of the infiltrate within the plurality channels of (Continued)

the filter; and curing the first portion of the infiltrate within the channels with the light to form a plurality of seals.

19 Claims, 5 Drawing Sheets

(51) Int. Cl.
 *B01J 20/28* (2006.01)
 *C04B 41/00* (2006.01)

(56) References Cited

U.S. PATENT DOCUMENTS

| | | | |
|---|---|---|---|
| 5,766,393 | A | 6/1998 | Nishimura et al. |
| 9,097,154 | B2 | 8/2015 | Kumagae et al. |
| 2002/0135107 | A1* | 9/2002 | Nishi ............ B01D 46/0001 |
| | | | 264/630 |
| 2003/0160364 | A1 | 8/2003 | Boorom et al. |
| 2005/0042419 | A1 | 2/2005 | Kato |
| 2007/0221312 | A1 | 9/2007 | Ichikawa |
| 2012/0306123 | A1* | 12/2012 | Maurey ............ B28B 11/006 |
| | | | 264/494 |
| 2014/0191427 | A1 | 7/2014 | Anderson et al. |
| 2018/0117835 | A1 | 5/2018 | Homa et al. |

FOREIGN PATENT DOCUMENTS

| | | |
|---|---|---|
| EP | 0597237 A2 | 5/1994 |
| EP | 1213612 A2 | 6/2002 |
| JP | 03-007512 A | 1/1991 |
| KR | 10-2009-0067577 A | 6/2009 |
| WO | 2004/002434 A1 | 1/2004 |
| WO | 2016/154645 A1 | 10/2016 |

OTHER PUBLICATIONS

Decker Christian, "The use of UV irradiation in polymerization", Polymer International, vol. 45, 1998, pp. 133-141.
Decker Christian., "In situ monitoring of ultrafast photopolymerizations by real-time infrared spectroscopy", Polymer News, vol. 30, 2005, pp. 34-48.
Decker et al., "High-speed polymerization of acrylate monomers by UV irradiation", Polymer Preprints (American Chemical Society, Division of Polymer Chemistry), vol. 38, 1997, pp. 487-488.
Decker et al., "Performance analysis of acylphosphine oxides in photoinitiated polymerization", Polymer, vol. 42, 2001, pp. 7551-7560.
Decker et al., "Synthesis of composite materials by photopolymerization", From Abstracts of Papers, 228th ACS National Meeting, Aug. 22-26, 2004, 2 pages.
Derwent Innovation, "Method of making porous plugged, monolith particulate trap by dipping ceramic honeycomb structure into plug material slurry and then burning material to sinter material in channels", RD247009A, 1984, 3 pages.
Huang et al., "Fabrication of functional microstructured optical fibers through a selective-filling technique", Applied Physics Letters, vol. 85, 2004, pp. 5182-5184.
International Search Report and Written Opinion of the International Searching Authority; PCT/US19/39158; dated Sep. 13, 2019; 10 Pages; European Patent Office.
Liu et al., "Extremely deep photopolymerization using upconversion particles as internal lamps", Polymer Chemistry, vol. 7, issue 14, 2016, pp. 2457-2463.
Wei et al., "Fabrication of a transparent and self-assembled microlens array using hydrophilic effect and electric field pulling", Journal of Micromechanics and Microengineering, vol. 22, 2012.
Xia et al., "Micromolding of Polymers in Capillaries: Applications in Microfabrication", Chemistry of Materials, vol. 8, 1996, pp. 1558-1567.
Zhou et al., "Fast curing of thick components of epoxy via modified UV-triggered frontal polymerization propagating horizontally", Materials Letters, vol. 176, 2016, pp. 228-231.

* cited by examiner

SELECTIVE MASKING AND PLUGGING OF HONEYCOMB BODIES

This is a national stage application under 35 U.S.C. § 371 of International Application No. PCT/US2019/039158, filed Jun. 26, 2019, which claims the benefit of priority under 35 U.S.C. § 119 of U.S. Provisional Application Ser. No. 62/693,643 filed on Jul. 3, 2018, the content of which is incorporated herein by reference in its entirety.

FIELD OF THE DISCLOSURE

The present disclosure generally relates to particulate filters, and more specifically, to methods of masking and plugging filters.

BACKGROUND

Ceramic wall flow filters typically have porous honeycomb structures with the plugs sealing alternate channels, which force exhaust gas flow through porous channel walls to exit from adjoining channels.

SUMMARY OF THE DISCLOSURE

A method of plugging a honeycomb body is disclosed herein, the method comprising: contacting a first end of the honeycomb body comprising a plurality of channels with a light curable sealing mixture such that an infiltrate of the light curable sealing mixture flows into the plurality of channels proximate the first end; emitting a light toward a first portion of the infiltrate within the plurality channels of the filter; and curing the first portion of the infiltrate within the channels with the light to form a plurality of seals.

Also disclosed herein is a method of plugging a honeycomb body, the method comprising: contacting a first end of the honeycomb body comprising a plurality of channels with a ultraviolet curable sealing mixture such that an infiltrate of the ultraviolet curable sealing mixture flows into the plurality of channels proximate the first end; emitting a light comprising ultraviolet light toward a first portion of the infiltrate within the plurality channels of the honeycomb body; curing the first portion of the infiltrate positioned within the channels with the light to form a plurality of seals in the plurality of channels; and removing the honeycomb body from the ultraviolet curable sealing mixture such that a second portion of the infiltrate drains from the channels.

Also disclosed herein is a method of plugging the honeycomb body, the method comprising: contacting a first end of the honeycomb body comprising a plurality of channels with a ultraviolet curable sealing mixture such that an infiltrate of the ultraviolet curable sealing mixture flows into the plurality of channels proximate the first end; imaging the first end of the honeycomb body through the ultraviolet curable sealing mixture; emitting a light comprising ultraviolet light toward a first portion of the infiltrate within a first portion of the plurality channels of the honeycomb body; curing the first portion of the infiltrate positioned within the first portion of the plurality of channels with the light to form a plurality of seals; removing the honeycomb body from the ultraviolet curable sealing mixture such that a second portion of the infiltrate drains from the channels; and removing the plurality of seals from the honeycomb body.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
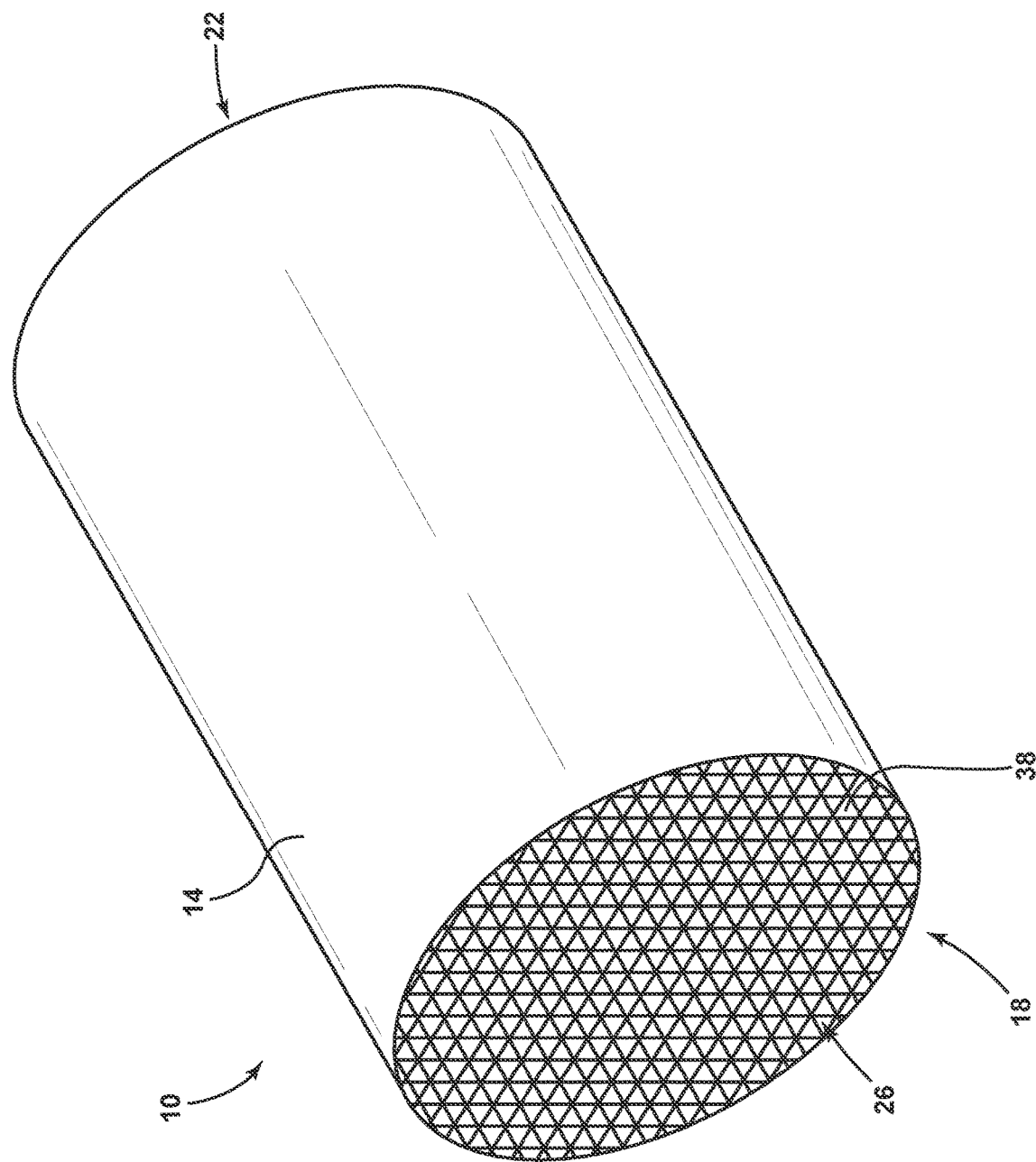
FIG. 1 is a perspective view of a filter, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 2:
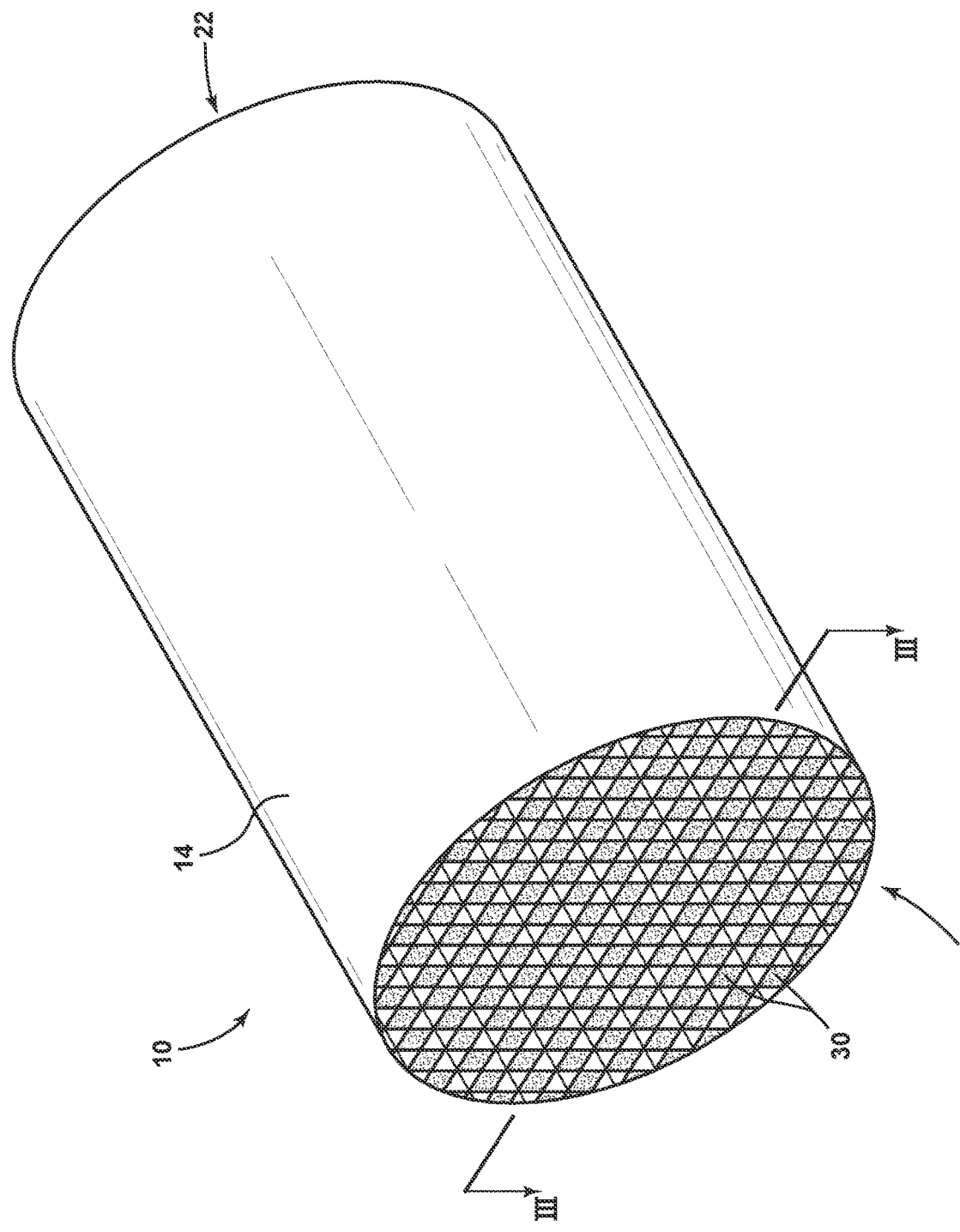
FIG. 2 is a perspective view of the filter including a plurality of plugs, according to at least one example.

FIGS. 1 and 2 show a filter 10 comprising a honeycomb body 14 comprising a first end 18 and a second end 22. The honeycomb body 14 comprises intersecting cell walls that form a plurality of channels 26 extending from the first end 18 to the second end 22. According to various examples, a filter 10 comprises a plurality of plugs 30 positioned within at least some of the channels 26, in some embodiments at first and second ends 18, 22, of the honeycomb body 14.

Referring now to FIG. 1, the honeycomb body 14 comprises a matrix of intersecting cell walls comprise thin, porous walls 38 which extend across and between the first and second ends 18, 22 to form a large number of adjoining channels 26. The channels 26 extend between and are open at the first and second ends 18, 22 of the honeycomb body 14. According to various examples, the channels 26 are mutually parallel with one another. The honeycomb body 14 may comprise a transverse cross-sectional channel density of from about 10 channels/in$^2$ to about 900 channels/in$^2$, or from about 20 channels/in$^2$ to about 800 channels/in$^2$, or from about 30 channels/in$^2$ to about 700 channels/in$^2$, or from about 40 channels/in$^2$ to about 600 channels/in$^2$, 50 channels/in$^2$ to about 500 channels/in$^2$, or from about 60 channels/in$^2$ to about 400 channels/in$^2$, or from about 70 channels/in$^2$ to about 300 channels/in$^2$, or from about 80 channels/in$^2$ to about 200 channels/in$^2$, or from about 90 channels/in$^2$ to about 100 channels/in$^2$, or form about or from about 100 channels/in$^2$ to about 200 channels/in$^2$ or any and all values and ranges therebetween. The walls 38 may have a thickness in mils (i.e., thousands of an inch) of from about 1 mil to about 15 mils, or from about 1 mil to about 14 mils, or from about 1 mil to about 13 mils, or from about 1 mil to about 12 mils, or from about 1 mil to about 11 mils, or from about 1 mil to about 10 mils, or from about 1 mil to about 9 mils, or from about 1 mil to about 8 mils, or from about 1 mil to about 7 mils, or from about 1 mil to about 14 mils, or from about 1 mil to about 6 mils, or from about 1 mil to about 5 mils, or from about 1 mil to about 4 mils, or from about 1 mil to about 3 mils, or from about 1 mil to about 2 mils or any and all values and ranges therebetween. It will be understood that although the channels 26 are depicted with a generally square cross-sectional shape, the channels 26 may have a circular, triangular, rectangular, pentagonal or higher order polygon cross-sectional shape without departing from the teachings provided herein.

The honeycomb body 14 may be formed of a variety of materials including ceramics, glass-ceramics, glasses, metals, and by a variety of methods depending upon the material selected. According to various examples, a green body which is transformed into honeycomb body 14 may be initially fabricated from plastically formable and sinterable finely divided particles of substances that yield a porous material after being fired. Suitable materials for a green body which is formed into the honeycomb body 14 comprise metallics, ceramics, glass-ceramics, and other ceramic based mixtures. In some embodiments, the honeycomb body 14 is comprised of a cordierite (e.g., $2MgO \cdot 2Al_2O_3 \cdot 5SiO_2$) material.

Referring to FIG. 2, the filter 10 can be formed from the honeycomb body 14 by closing or sealing a first subset of channels 26, such as at the first end 18 with plugs 30, and the remaining channels 26 (for example alternating channels 26) being closed at the second end 22 of the honeycomb body 14, using other plugs 30. In operation of the filter 10, fluids such as gases carrying solid particulates are brought under pressure to the inlet face (e.g., the first end 18). The gases then enter the honeycomb body 14 via the channels 26 which have an open end at the first end 18, pass through the walls 38 of the porous cell walls, and out the channels 26 which have an open and at the second end 22. Passing of the gasses through the walls 38 may allow the particulate matter in the gases to remain trapped by the walls 38.

Figure 3:
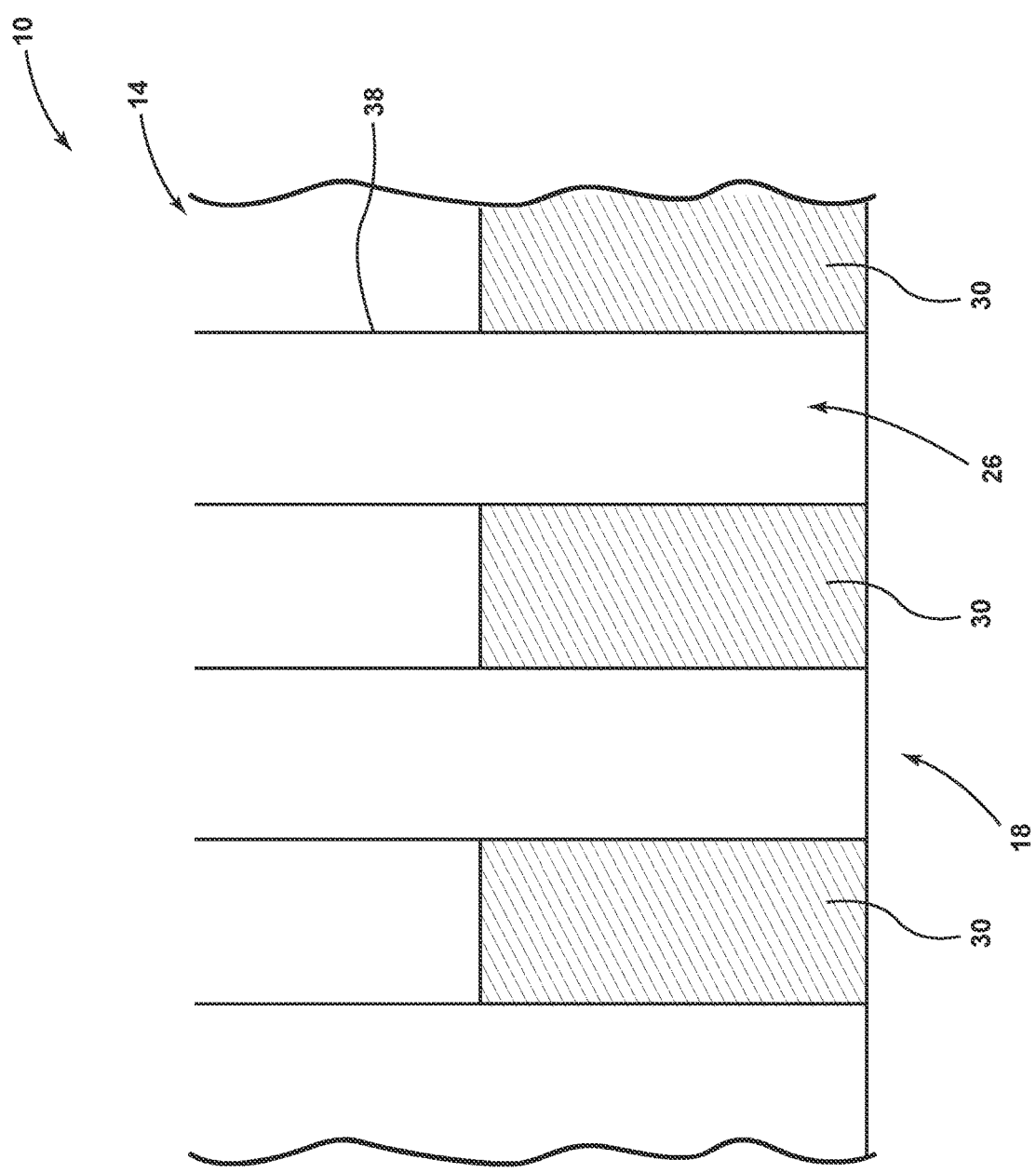
FIG. 3 is a cross-sectional view taken at line of FIG. 2, according to at least one example.

As schematically illustrated in FIGS. 2 and 3, plugs 30 may be positioned in the channels 26 in an alternating manner. In the depicted example, the plugs 30 are positioned across the first and second ends 18, 22 of the honeycomb body 14 in a "checkerboard" pattern, but it will be understood that other patterns may also be applied. In the checkerboard pattern, each of an open channel's 26 nearest neighbor channels 26 on an end (e.g., either the first or second end 18, 22) includes a plug 30.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, of about 6.5 mm or greater. For example, the plugs 30 may have an axial length of from about 0.5 mm to about 10 mm, or from about 1 mm to about 9 mm, or from about 1 mm to about 8 mm, or from about 1 mm to about 7 mm, or from about 1 mm to about 6 mm, or from about 1 mm to about 5 mm, or from about 1 mm to about 4 mm, or from about 1 mm to about 3 mm, or from about 1 mm to about 2 mm or any and all value and ranges therebetween. According to various examples, the plurality of plugs 30 located on the first end 18 of the body 14 may have a different length than the plugs 30 positioned on the second end 22 of the body 14.

The variation in length for a plurality of plugs 30 may be expressed as a standard deviation and is calculated as the square root of variance by determining the variation between each length relative to the average length of the plugs 30. The standard deviation of the plurality of plugs 30 is a measure of the variance in the length of plugs 30 positioned, for example, on either the first or second ends 18, 22 of the honeycomb body 14. All of the plurality of plugs 30 on one end (e.g., the first or second end 18, 22) may have a standard deviation in length of from about 0.1 mm to about 3.0 mm. For example, a standard deviation in length of the plugs 30 may be about 3.0 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less or any and all values and ranges therebetween. According to various examples, the plurality of plugs 30 located on the first end 18 of the body 14 may have a different standard deviation than the plugs 30 positioned on the second end 22 of the body 14.

Figure 4:
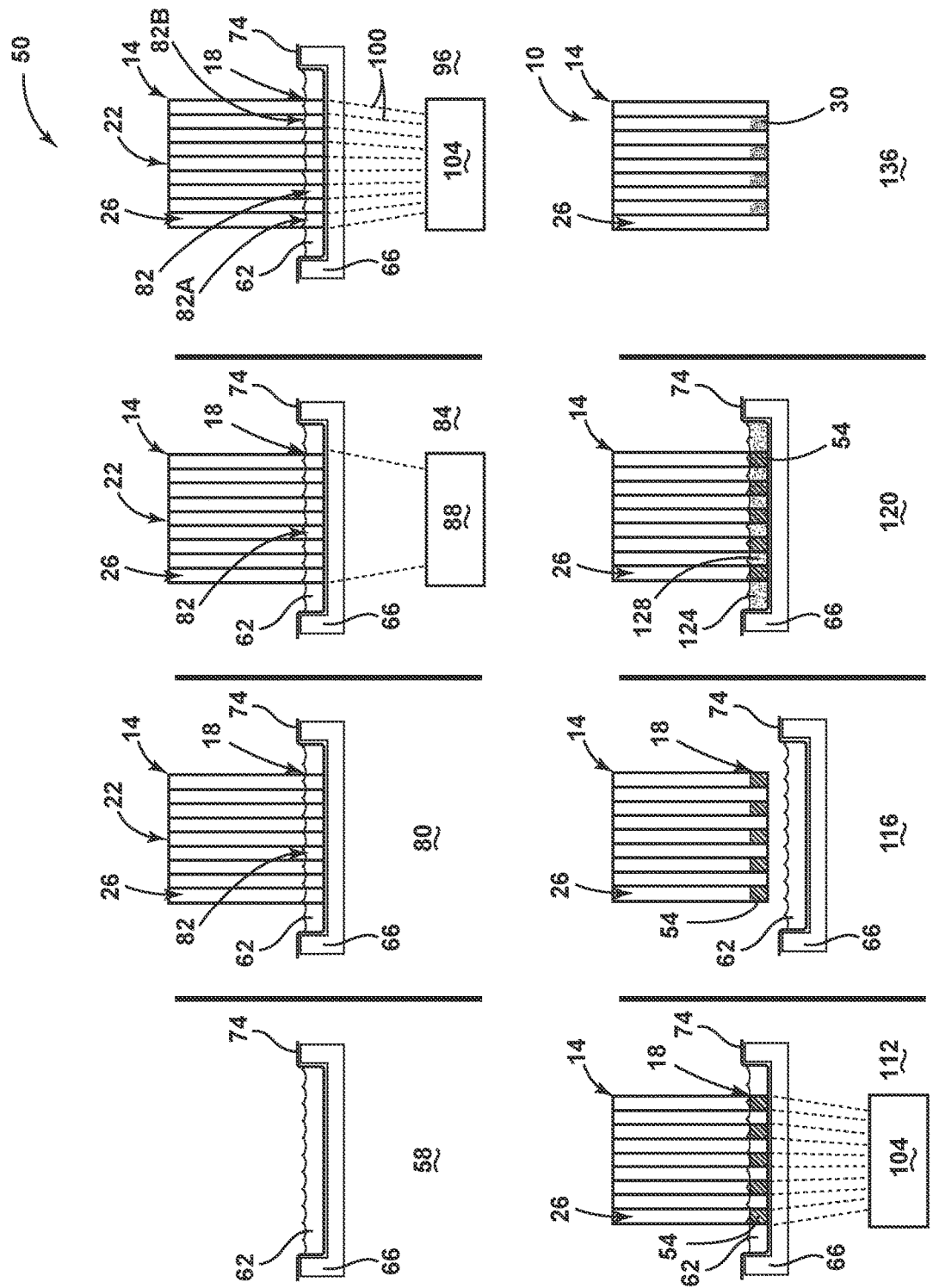
FIG. 4 is a schematic illustration of a method, according to at least one example.

Referring now to FIG. 4, the filter 10 may be formed via a method 50. As will be explained in greater detail below, the method 50 includes steps to form a plurality of seals 54 in the honeycomb body 14. According to various examples, the seals 54 may be used in lieu of conventional masking layers to prevent the penetration of cement used in the formation of the plugs 30 in certain channels 26. According to yet other examples, the seals 54 may be used as the plugs 30. In such examples, the foregoing description of the plugs 30 may be applied to the seals 54. In other words, the seals 54 are the plugs 30.

The method 50 may begin with a step 58 of positioning sealing mixture 62 on a substrate. According to various examples, step 58 may include positioning sealing mixture 62 in a container 66. The sealing mixture 62 may be a liquid, gel or fluid with a sufficiently low viscosity that it may freely or through the use of force enter the channels 26. According to various examples, the sealing mixture 62 may be curable, or configured to be hardened (e.g., have its viscosity increased), by one or more forms of energy. According to various examples, the sealing mixture 62 may be light-curable such that one or more wavelengths or wavelength bands of light (e.g., the electromagnetic spectrum) may cure or harden the sealing mixture 62. For example, the sealing mixture 62 may be curable by ultraviolet (UV) light (e.g., light having a wavelength of from about 180 nm to about 400 nm), visible light (e.g., light having a wavelength of from about 400 nm to about 700 nm) and/or by infrared light (e.g., light having a wavelength of from about 700 nm to about 1 mm). In ultraviolet curable examples of the sealing mixture 62, the ultraviolet light may be deep UV having a wavelength of from about 1 nm to about 180 nm, UVA (e.g., near UV) having a wavelength of from about 315 nm to about 400 nm, UVB (e.g., middle UV) having a wavelength of from about 280 nm to about 315 nm and/or UVC (e.g., far UV) having a wavelength of from about 180 nm to about 280 nm. It will be understood that the sealing mixture 62 may be curable under other conditions as well such as ionizing radiation, heat, electron beam, and/or other forms of energy which may cure the sealing mixture 62. According to various examples, the sealing mixture 62, once cured or solidified, may be capable of melting, un-curing, oxidizing and/or otherwise being removed from the honeycomb body 14 through the application of additional energy and/or through other processes.

The sealing mixture 62 may be formed of single or a variety of constituents. For example, the sealing mixture 62 may include an acrylate, an acrylic, a cyano acrylate, a silicone, an acrylated urethane, one or more photopolymers, an ester of cinnamic acid, an oligomer of styrene-tetramer-alpha cumyl end group, an A-methyl styrene-dimer (1), an A-methyl styrene-tetramer, an acrylic acid oligomer, a methyl methacrylate oligomer, a methyl methacrylate tetramer, a vinyl alcohol trimer, a vinylacetate trimer, a vinylacetate oligomer, poly isobutylene, triglycerol, poly propylene glycol (dihydroxy terminated), an acrylic acid, a methacrylic acid, isodecyl acrylate, N-vinyl pyrrolidone, trimethylopropane triacrelate, ethoxylated trimethylopropane triacrelate, trimethylepropane trimethacrylate, hexanediol diacrylate, isopropylthioxanthone, benzophenone, 2,2-azobisisobutyronitrile, diaryliodonium salts, triarylsulfonium salts, hydrophobic agents, hydrophilic agents, phototiniators, additives (e.g., pigments, fillers, defoamers, flattening agents, wetting agents, slip aids, etc.), oligomers and monomers, water, oils, other compounds and/or combinations thereof.

According to various examples, the sealing mixture 62 may be translucent and/or transparent to one or more wavelengths of light. For example, the sealing mixture 62 may have a transmittance of about 80% or greater, about 81% or greater, about 82% or greater, about 83% or greater, about 84% or greater, about 85% or greater, about 86% or greater, about 87% or greater, about 88% or greater, about 89% or greater, about 90% or greater, about 91% or greater, about 92% or greater, about 93% or greater, about 94% or greater, about 95% or greater, about 96% or greater, about 97% or greater, about 98% or greater, about 99% or greater, about 99.5% or greater to any of the above noted wavelength and/or wavelength ranges. According to various examples, the sealing mixture 62 may be colored or tinted. For example, the sealing mixture 62 may have a color or tint corresponding to red, green, blue, other colors and/or combinations thereof.

The sealing mixture 62 is positioned in the container 66. The sealing mixture 62 may have a depth, or fill level, within the container 66 of from about 0.1 mm to about 10 mm. For example, the sealing mixture 62 may have a depth in the container 66 of about 0.1 mm or greater, about 0.5 mm, about 1.0 mm or greater, about 1.5 mm or greater, about 2.0 mm or greater, about 2.5 mm or greater, about 3.0 mm or greater, about 3.5 mm or greater, about 4.0 mm or greater, about 4.5 mm or greater, about 5.0 mm or greater, about 5.5 mm or greater, about 6.0 mm or greater, about 6.5 mm or greater, about 7.0 mm or greater, about 7.5 mm or greater, about 8.0 mm or greater, about 8.5 mm or greater, about 9.0 mm or greater, about 9.5 mm or greater, about 10 mm or greater or any and all values and ranges therebetween. According to various examples, the fill depth of the sealing mixture 62 within the container 66 may substantially correspond to the desired depth of the seals 54 within the channels 26 of the honeycomb body 14 as will be explained in greater detail below.

The container 66 may be formed of a glass, glass-ceramic, ceramic, polymer, composite material, other material and/or combinations thereof. According to various examples, the container 66 may be translucent, substantially transparent and/or transparent to one or more wavelengths or wavelength bands of light. In other words, the container 66 may be light transparent. For example, the container 66 may have a transmittance of from about 50% to about 100%, or about 60% to about 100%, or about 70% to about 100%, or about 80% to about 100%, or about 90% to about 100%, or about 95% to about 100% to one or more wavelengths or wavelength bands of light having a wavelength of from about 1 nm to about 1 mm. It will be understood that any and all values and ranges therebetween for the transmittance and wavelength are contemplated. The container 66 may be rigid or flexible. In flexible examples of the container 66, the container 66 may be capable of repeated deflection or distortion under force without breaking. Flexible examples of the container 66 may be advantageous in allowing the honeycomb body 14 to be released from the container 66 by flexing or distorting the container 66.

According to various examples, step 58 may include positioning a liner 74 or membrane between the container 66 and the sealing mixture 62. The liner 74 may include a glass, glass-ceramic, ceramic, polymer, composite material, other materials and/or combinations thereof. For example, the liner 74 may be composed of polyvinyl chloride, low-density polyethylene, linear low-density polyethylene, polyvinylidene chloride, cellulose, other materials and/or combinations thereof. According to various examples, the liner 74 may be flexible. In flexible examples of the liner 74, the liner 74 may be capable of repeated deflection or distortion under force without ripping, tearing, or breaking. According to various examples, the liner 74 may be translucent, substantially transparent and/or transparent to one or more wavelengths or wavelength bands of light. For example, the liner 74 may have a transmittance of from about 50% to about 100%, or about 60% to about 100%, or about 70% to about 100%, or about 80% to about 100%, or about 90% to about 100%, or about 95% to about 100% to one or more wavelengths or wavelength bands of light having a wavelength of from about 1 nm to about 1 mm. As the container 66, the liner 74 and the sealing mixture 62 may both be translucent, substantially transparent and/or transparent, the honeycomb body 14, including the plurality of channels 26 and the walls 38, may be visible through a bottom and/or side of the container 66. According to various examples, the liner 74 may include one or more adhesives which may aid in bonding the liner 74 to the container 66. For example, one or more sides of the liner 74 may have an adhesive applied (e.g., an adhesive backing) to secure the liner 74 to the container 66. Use of such a flexible liner 74 may aid in the nondestructive release of the honeycomb body 14 from the container 66 after one or more steps of the method 50 are complete. In practice, the liner 74 may be laid within the container 66 prior to placement of the sealing mixture 62 into the container 66.

Next, a step 80 of placing the first end 18 of the honeycomb body 14 including the plurality of channels 26 into the sealing mixture 62 such that an infiltrate 82 of the sealing mixture 62 flows into the plurality of channels 26 proximate the first end 18 is performed. As the sealing mixture 62 may have a sufficiently low viscosity that it is a liquid or gel, the infiltrate 82 of the sealing mixture 62 flows into the plurality of channels 26. The infiltrate 82 of the sealing mixture 62 may rise within the plurality of channels 26 to the same height as the portion of the sealing mixture 62 which is not in the plurality of channels 26. In other words, the infiltrate portion 82 of the sealing mixture 62 may self-level within the plurality of channels 26 to be the same height as the sealing mixture 62 within the container 66. Wetting, wicking, or the interaction between the honeycomb body 14 and the sealing mixture 62 may also cause the infiltrate portion 82 of the sealing mixture 62 to flow into the plurality of channels 26. Control of the wetting of the sealing mixture 62 to the honeycomb body 14 may be controlled by the composition of the sealing mixture 62 (e.g., adding oils, water, additives, etc.), applying a hydrophobic and/or hydrophilic coating to the plurality of channels 26 to a prescribed depth within the honeycomb body 14 and/or by presoaking the honeycomb body 14. In presoaking examples, the honeycomb body 14 may be soaked in a water, oil and/or solution for a predetermined time period (e.g., from about 1 second to about 1 hour) at an elevated temperature (e.g., from about 30° C. to about 90° C.) such that wetting and/or wicking of the infiltrate 82 may be controlled. Controlling the wetting or wicking of the infiltrate 82 into the plurality of channels 26 may be advantageous in allowing control of the depth of the infiltrate 82 within the plurality of channels 26 and thereby controlling the final depth of the seals 54 within the plurality of channels 26. It will be understood that placing of the first end 18 of the honeycomb body 14 in the sealing mixture 62 may be performed under pressure or force and/or may be done under the force of gravity.

Next, a step 84 of imaging the first end 18 of the honeycomb body 14 to determine the location of the plurality of channels 26 is performed. According to various examples, step 84 may be accomplished using an imager 88. In operation, the imager 88 may be moved to the location of the honeycomb body 14 and container 66 or the honeycomb body 14 and container 66 may be moved to the location of the imager 88. The imager 88 may be a charge-coupled device (CCD), a complementary metal-oxide-semiconductor device (CMOS) other types of imagers 88 and/or combinations thereof. It will be understood that a single imager 88 may be utilized or a plurality of imagers 88 may be used. Further, the imager 88 and/or container 66 and honeycomb body 14 may remain stationary during step 84, or relative motion between the imager 88 and the container 66 and honeycomb body 14 may be used to image the first end 18. The imager 88 is configured to obtain still images and/or video of the first end of the honeycomb body 14. According to various examples, the imager 88 may be positioned below the honeycomb body 14 and container 66 such that the imager 88 images the first end 18 of the honeycomb body 14 through the container 66, sealing mixture 62 and/or liner 74, but it will be understood that the first end 18 of the honeycomb body 14 may be imaged from a variety of locations. For example, the first end 18 of the honeycomb body 14 may be imaged from an angle non-perpendicular to the first end 18, from a side of the honeycomb body 14 and/or from the second end 22 of the honeycomb body 14 (i.e., through the plurality of channels 26 to the first end 18).

Images and/or video retrieved from the imager 88 may be provided to one or more vision analysis software programs and/or algorithms which are configured to determine the size, shape and location of the plurality of channels 26. For example, the vision analysis software and/or algorithms may be able to distinguish between half-channels and quarter channels positioned around an edge of the honeycomb body 14 from full-channels positioned away from the edge of the honeycomb body 14. Once the vision analysis software and/or algorithms have identified the size, shape and location of the plurality of channels 26, the vision analysis software and/or algorithms may output a lighting pattern for use in later steps of the method 50. For example, the lighting pattern may designate a number of channels 26 which should receive light and a plurality of channels 26 which should not receive light. The lighting pattern may take a variety of configurations. For example, the lighting pattern may be in a checkerboard pattern similar to the layout of the plugs 30, one or more patterns or indicia (e.g., alphanumeric text, symbols, pictures, images, logotypes, etc.) and/or other shapes. In process runs of the method 50 where the method 50 is performed a number of times each on a separate honeycomb body 14, step 84 may only be performed a single time when each of the filters 10 are substantially similar in shape, size and distribution of the channels 26. In other words, a single honeycomb body 14 may be imaged to develop the lighting pattern and the lighting pattern can be applied to a number of other filters 10 in the method 50. Further, when the method 50 is performed on the second side 22 of the honeycomb body 14, step 84 may be omitted if the first and second ends 18, 22 of the honeycomb body 14 are substantially similar. Use of step 84 for every run of method 50 may be advantageous in accounting for variability in the geometry of the honeycomb body 14 as well as placement of the honeycomb body 14. It will be understood that one or more visual indicators or markers (e.g., colorations, stickers, etc.) may be placed on the honeycomb body 14, container 66 or utilized by the vision analysis software such that a reference point on the container 66 and/or honeycomb body 14 may be identified in order to create the lighting pattern.

Next, a step 96 of emitting a light 100 toward a first portion 82A of the infiltrate 82 within the plurality channels 26 of the honeycomb body 14 is performed. A second portion 82B of the infiltrate 82 may not have the light 100 impinging on it or will have less light impinging on it relative to the first portion 82A. The light 100 may include any of the above-noted wavelengths and/or wavelength bands of light which may cure the sealing mixture 62. Further, the light 100 may be any wavelength or wavelength band of the electromagnetic spectrum which may cure the sealing mixture 62. The light 100 may be emitted from one or more light sources 104 based on the lighting pattern produced by the vision analysis software. The light source 104 may be a projector (e.g., capable of emitting a static or dynamic lighting pattern), a laser and/or other types of light sources 104. In projector examples of the light source 104, the projector may be a digital light projector. In operation of step 96, the honeycomb body 14 and container 66 may be moved to the light source 104 and/or the light source 104 may be moved to the honeycomb body 14. In yet other examples, one or more light direction systems (e.g., mirrors, prisms, etc.) may be employed such that the light source 104 may be positioned remotely from the honeycomb body 14 and/or container 66. According to various examples, the light source 104 may be positioned to emit the light 100 through the container 66, the liner 74 and/or the sealing mixture 62. In other words, the light 100 from the light source 104 is passed through the container 66, the sealing mixture 62 and/or liner 74. For example, the light source 104 may be positioned below the honeycomb body 14 and/or container 66. The light source 104 may additionally or alternatively be positioned proximate a side or top of the honeycomb body 14. According to various examples, the light source 104 may emit the light 100 proximate the second end 22 of the honeycomb body 14 such that the light 100 travels down the plurality of channels 26 to contact the sealing mixture 62.

According to various examples, the lighting pattern emitted from the light source 104 may be a static light pattern. In other words, the pattern of light emitted from the light source 104 may not move or change. In such examples, the lighting pattern may be in a checkerboard pattern (i.e., the light 100 is emitted such that it impinges on the first portion 82A of the infiltrate 82 in alternating channels 26 of the honeycomb body 14). It will be understood that other static lighting patterns may be emitted from the light source 104. In dynamic examples of the lighting pattern, the light 100 from the light source 104 may be rastered, translated, intermittently emitted and/or otherwise moved across the plurality of channels 26. For example, in laser examples of the light source 104, the light source 104 may emit or pulse the light 100 at a specific channel 26 and after a predetermined period of time move to another channel 26.

The light 100 may be emitted toward the first portion 82A of the infiltrate 82 for a predetermined period of time (e.g., sufficiently long to cure the infiltrate 82). For example, the step of emitting the light 100 toward the first portion 82A of the infiltrate 82 within the plurality of channels 26 is performed from about 1 second to about 20 minutes, or from about 1 second to about 19 minutes, or from about 1 second to about 18 minutes, or from about 1 second to about 19 minutes, or from about 1 second to about 18 minutes, or from about 1 second to about 17 minutes, or from about 1 second to about 16 minutes, or from about 1 second to about 15 minutes, or from about 1 second to about 14 minutes, or from about 1 second to about 13 minutes, or from about 1 second to about 12 minutes, or from about 1 second to about 11 minutes, or from about 1 second to about 10 minutes, or from about 1 second to about 9 minutes, or from about 1 second to about 8 minutes, or from about 1 second to about 7 minutes, or from about 1 second to about 6 minutes, or from about 1 second to about 5 minutes, or from about 1 second to about 4 minutes, or from about 1 second to about 3 minutes, or from about 1 second to about 2 minutes, or from about 1 second to about 1 minute, or from about 1 second to about 45 seconds, or from about 1 second to about 30 seconds, or from about 1 second to about 15 seconds or any and all values and ranges therebetween. It will be understood that the time the light 100 is emitted toward the first portion 82A of the infiltrate 82 may be dependent on the intensity or power output of the light source 104 as well as the composition of the sealing mixture 62 (i.e., how readily the sealing mixture 62 cures).

Next, a step 112 of curing the first portion 82A of the infiltrate 82 positioned within the plurality of channels 26 with the light 100 to form the plurality of seals 54 is performed. It will be understood that although described as separate steps for clarity, steps 96 and 112 may be performed substantially simultaneously without departing from the teachings provided herein. Curing of the first portion 82A of the infiltrate 82 may result in increasing viscosity, hardness and/or rigidity of the first portion 82A such that curing of the first portion 82A forms the plurality of seals 54. As the curing of the first portion 82A of the infiltrate 82 is carried out by the light 100, the plurality of seals 54 is formed in the channels 26 which were exposed to the light 100. As such, the plurality of seals 54 is formed in the same pattern (e.g., checkerboard) as the lighting pattern. It will be understood that as the second portion 82B of the infiltrate 82 is not or only minimally exposed to the light 100, the second portion 82B does not cure and may remain in the low viscosity state similar to the sealing mixture 62.

As the infiltrate 82 of the sealing mixture 62 is in intimate contact with the walls 38 of the honeycomb body 14, the plurality of seals 54 may be secured within the channels 26. As explained above, the plurality of seals 54 may have any of the above-noted qualities and attributes explained above in connection with the plugs 30. As will be explained in greater detail below, the plurality of seals 54 may be the plurality of plugs 30 in examples where the seals 54 are composed of a material which may withstand the use requirements (e.g., temperature, vibration, pressure, etc.) of the finished honeycomb body 14. Depending on the composition of the sealing mixture 62, the plurality of seals 54 formed therefrom may be translucent, transparent, tinted, colored or have other properties similar to the sealing mixture 62. As the first portion 82A of the infiltrate 82 has been cured of form the plurality of seals 54, the second portion 82B of the infiltrate 82 within the plurality of channels 26 may remain in its liquid or gel uncured state.

Next a step 116 of removing the honeycomb body 14 from the sealing mixture 62 such that a second portion 82B of the infiltrate 82 drains from the plurality of channels 26. In other words, as the second portion 82B of the infiltrate 82 remains in the liquid or gel state within the plurality of channels 26, removal of the honeycomb body 14 from the sealing mixture 62 may allow the second portion 82B of the infiltrate 82 to drain, or flow out of, the plurality of channels 26. Removal of the sealing mixture 62 from the honeycomb body 14 may be assisted by vibration, compressed air, pressure, centrifugal force and or other methods of removing the second portion 82B of the infiltrate 82. For example, the honeycomb body 14 and/or infiltrate 82 may be heated to decrease the viscosity of the second portion 82B such that the second portion 82B drains out.

According to various examples, the completion of step 116 may conclude processing and formation of the honeycomb body 14. As explained above, the plurality of seals 54, depending on the composition of the sealing mixture 62, may be the plugs 30 of the honeycomb body 14 and may be used in the final filter 10. According to other examples, the plurality of seals 54 may instead function as a mask to temporarily seal off various channels 26 with the remainder of the channels 26 being plugged by a later process as disclosed above and the seals 54 removed.

In examples where the plurality of seals 54 are not the plugs 30, the method 50 may next proceed with a step 120 of contacting the honeycomb body 14 into a cement mixture 124 such that the plurality of channels 26 without one of the plurality of seals 54 are filled with a portion 128 of the cement mixture 124. The cement mixture 124 may be placed in the container 66 with a new liner 74 with the sealing mixture 62 removed, or into a different container 66. As the plurality of seals 54 is still positioned within the plurality of channels 26, the contacting of the honeycomb body 14 into the cement mixture 124 forces the cement mixture 124 into the open channels 26 which do not have the seals 54. Contact of the honeycomb body 14 with the cement mixture 124 may be done under gravitational force and/or through the use of additional force. The honeycomb body 14 may be immersed in the cement mixture 124 to a depth, or fill level, of from about 0.1 mm to about 10 mm. For example, the cement mixture 124 may have a depth in the container 66 of about 0.1 mm or greater, about 0.5 mm or greater, about 1.0 mm or greater, about 1.5 mm or greater, about 2.0 mm or greater, about 2.5 mm or greater, about 3.0 mm or greater, about 3.5 mm or greater, about 4.0 mm or greater, about 4.5 mm or greater, about 5.0 mm or greater, about 5.5 mm or greater, about 6.0 mm or greater, about 6.5 mm or greater, about 7.0 mm or greater, about 7.5 mm or greater, about 8.0 mm or greater, about 8.5 mm or greater, about 9.0 mm or greater, about 9.5 mm or greater, about 10 mm or greater or any and all values and ranges therebetween. According to various examples, the cement mixture 124 may self-level or settle within the channels 26 such that the portions 128 of cement mixture 124 within the channels have a generally consistent depth within the honeycomb body 14. The portions 128 of cement mixture 124 within the channels 26 may be fired, sintered or otherwise cured to form the plugs 30.

The cement mixture 124, and therefore the plugs 30, may be composed of a clay, an inorganic binder, water and a plurality of inorganic particles. According to various examples, the plugs 30 may include one or more additives (e.g., rheology modifiers, plasticizers, organic binders, foaming agents, etc.). The clay may include one or more colloidal clays, smectite clays, kaolinite clays, illite clays, and chlorite clays. The inorganic binder may take the form of silica, alumina, other inorganic binders and combinations thereof. The silica may take the form of fine amorphous, nonporous and generally spherical silica particles. At least one commercial example of suitable colloidal silica for the manufacture of the cement mixture 124 may include Ludox®. The plurality of inorganic particles within the cement mixture 124 may be composed of glasses, ceramics, glass-ceramics, cordierite and/or combinations thereof. According to various examples, the plurality of inorganic particles may have the same or a similar composition to that of the honeycomb body 14. For example, the plurality of inorganic particles may include cordierite and or other materials which, upon sintering, form a porous structure.

Next, a step 136 of removing the plurality of seals 54 from the honeycomb body 14 may be performed. As explained above, in examples of the filter 10 where the plurality of plugs 30 are formed from the cement mixture 124, the plurality of seals 54 may be not be needed once the portions 128 of cement mixture 124 are in place and therefore may be removed from the honeycomb body 14. The plurality of seals 54 may be removed from the honeycomb body 14 according to a variety of methods. For example, the plurality of seals 54 may be removed from the honeycomb body 14 by dissolving the plurality of seals 54. In such an example, the ends of the honeycomb body 14 including the seals 54 (e.g., the first and/or second ends 18, 22) may be dipped in a solvent which preferentially etches or dissolves the plurality of seals 54 as compared to the cement mixture 124 and/or the material of the honeycomb body 14. Additionally or alternatively, step 136 may be carried out by at least one of oxidizing the plurality of seals 54 and melting the plurality of seals 54. In such an example, the plurality of seals 54 may be exposed to sufficiently high temperatures that the seals 54 melt, burn and/or oxidize out of the honeycomb body 14. Such an example may be advantageous in that step 136 may be performed substantially simultaneously with a curing step of the portions 128 of the cement mixture 124 to form the plurality of plugs 30. It will be understood that any of the methods outlined for removing the seals 54 from the honeycomb body 14 may be used in combination with any other method without departing from the teachings provided herein.

It will be understood that although the method 50 was described in a particular order, the steps of the method 50 may be performed out of order and that one or more steps may be omitted or added without departing from the teachings provided herein.

Formation of the plurality of seals 54 allows for the ability to "mask" (i.e., seal the channels 26 from entry of the cement mixture 124) or plug the channels 26 of the honeycomb body 14 simultaneously. For example, conventional masking procedures may require the application of a mask followed by the individual formation of holes in the mask to allow cement to flow into designated channels 26. In the provided disclosure, the step of forming the plurality of seals 54 may be performed without the use of a mask and without the additional step of cutting holes in the mask. Further, in examples where the seals 54 are used as the plugs 30, the present disclosure offers the ability to plug the honeycomb body 14 without the additional steps of masking the channels 26, forming the holes and pressing the cement into the channels 26. Such features may offer not only a reduction in production time and cost, but also a simple single or multi-step process. As light sources 104 and imagers 88 are relatively inexpensive and scalable relative to high pressure pressing systems, use of the present disclosure may allow for a cost-effective manner of forming the seals 54 within the honeycomb body 14 as compared to conventional techniques. As the infiltrate 82 may be cured to form the seals 54 in a manner of seconds, significant time savings in the production of the filter 10 may be achieved. As the plurality of seals 54 may be used as the plugs 30, the honeycomb body 14 may be formed in fewer process steps than conventional techniques which may save both time and money in the manufacturing of the honeycomb body 14.

EXAMPLES

Provided is an exemplary and non-limiting example of the filter 10 consistent with the present disclosure.

Figure 5:
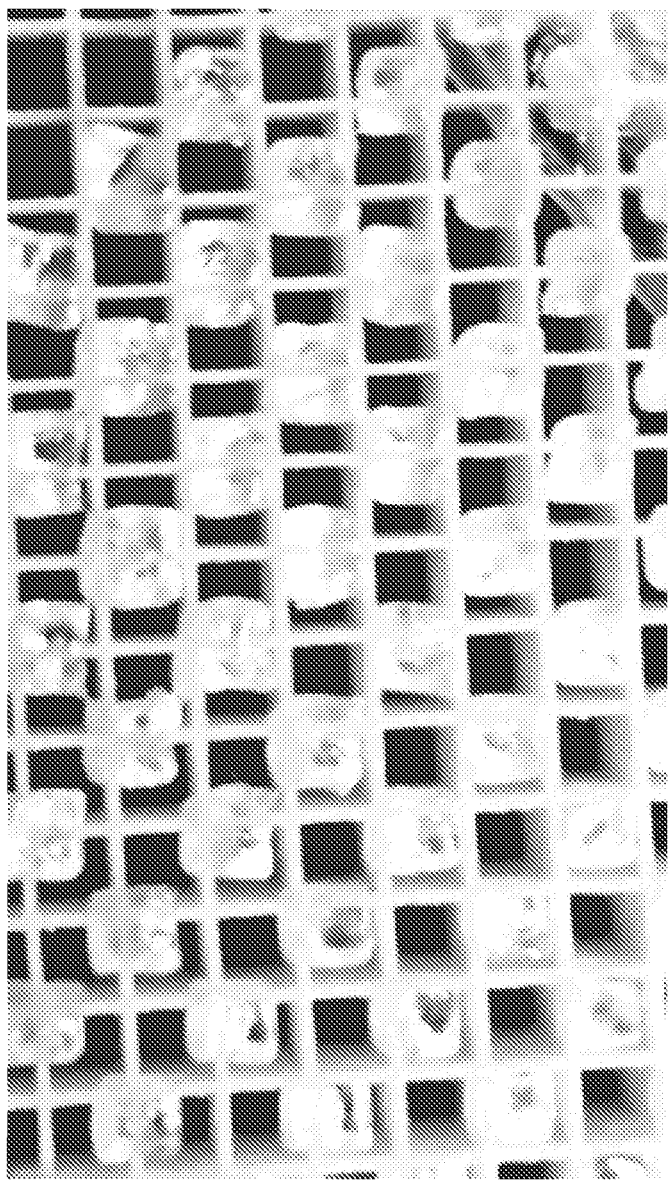
FIG. 5 is an image of a plurality of blockages formed on a gas particulate filter, according to at least one example.

Referring now to FIG. 5, depicted is a wall flow filter (e.g., the filter 10) having a plurality of blockages (e.g., seals 54) positioned within passages (e.g., channels 26) of the wall flow filter formed according to the present disclosure. The blockages were formed by submerging a portion of the wall flow filter in an ultraviolet light curable acrylic resin, imaging the submerged end of the wall flow filter to locate the location of the passages, developing a lighting pattern to be shined on the end of the wall flow filter, selectively emitting ultraviolet light onto the ultraviolet light curable acrylic resin in selected passages and curing the ultraviolet light curable acrylic resin to form the blockages. As can be seen from FIG. 5, the selective curing of the ultraviolet light curable acrylic resin produces highly consistent and uniform blockages across the submerged end of the wall flow filter. Although a number of the blockages were formed across one or more passages, it will be understood that enhanced control of the emission of the ultraviolet light and imaging of the wall flow filter will increase the precision of the location of the blockages within the passages. Such a wall flow filter may be used as a gas particulate filter as is. Alternatively, the wall flow filter may be placed in a cement (e.g., the cement mixture 124) such that the open passages (e.g., passages without a blockage) are at least partially filled with the cement. The cement may later be cured and the blockages removed such that the screen may be used as a wall flow filter.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below.

What is claimed is:

1. A method of plugging a honeycomb body, the method comprising the steps:
   contacting a first end of the honeycomb body comprising a plurality of channels with a light curable sealing mixture disposed in a light transparent container such that an infiltrate of the light curable sealing mixture flows into the plurality of channels proximate the first end;
   emitting a light directed at the first end of the honeycomb body to expose a first portion of the infiltrate within the plurality channels to the light, wherein the light is emitted from a light source which is positioned such that the light passes through the container prior to reaching the honeycomb body; and
   curing the first portion of the infiltrate within the channels with the light to form a plurality of seals.

2. The method of claim 1, wherein a liner is positioned between the light curable sealing mixture and the container and the light passes through the liner.

3. The method of claim 2, wherein the liner is flexible and substantially transparent to the light.

4. The method of claim 1, further comprising the step of:
   removing the honeycomb body from the light curable sealing mixture such that a second portion of the infiltrate drains from the plurality of channels.

5. The method of claim 1, wherein the step of emitting light directed at the first end of the honeycomb body to expose a first portion of the infiltrate within the plurality channels of the honeycomb body is performed from about 1 second to about 3 minutes.

6. The method of claim 1, wherein the step of emitting light directed at the first end of the honeycomb body to expose a first portion of the infiltrate within the plurality channels of the honeycomb body is performed from about 1 second to about 2 minutes.

7. The method of claim 1, further comprising the step of:
   imaging the first end of the honeycomb body to determine a location of the plurality of channels.

8. The method of claim 1, further comprising:
contacting the honeycomb body with a cement mixture such that a plurality of channels without a seal are filled with a portion of the cement mixture.

9. The method of claim 1, wherein the light is emitted toward the honeycomb body in a checkerboard pattern across the plurality of channels.

10. A method of plugging a honeycomb body, comprising the steps:
contacting a first end of the honeycomb body comprising a plurality of channels with an ultraviolet curable sealing mixture disposed in a container such that an infiltrate of the ultraviolet curable sealing mixture flows into the plurality of channels proximate the first end;
emitting a light comprising ultraviolet light toward a first portion of the infiltrate within the plurality channels of the honeycomb body;
curing the first portion of the infiltrate positioned within the channels with the light to form a plurality of seals in the plurality of channels, wherein the light is emitted from a light source which is positioned such that the light passes through the container prior to reaching the honeycomb body; and
removing the honeycomb body from the ultraviolet curable sealing mixture such that a second portion of the infiltrate drains from the channels.

11. The method of claim 10, wherein the container is a substantially transparent container.

12. The method of claim 10, wherein the emitted light is passed through the ultraviolet curable sealing mixture.

13. The method of claim 10, wherein the emitted light is a static pattern of light across the first end of the honeycomb body.

14. A method of plugging a honeycomb body, comprising the steps:
contacting a first end of the honeycomb body comprising a plurality of channels with a ultraviolet curable sealing mixture such that an infiltrate of the ultraviolet curable sealing mixture flows into the plurality of channels proximate the first end;
imaging the first end of the honeycomb body through the ultraviolet curable sealing mixture;
emitting a light comprising ultraviolet light toward a first portion of the infiltrate within a first portion of the plurality channels of the honeycomb body;
curing the first portion of the infiltrate positioned within the first portion of the plurality of channels with the light to form a plurality of seals;
removing the honeycomb body from the ultraviolet curable sealing mixture such that a second portion of the infiltrate drains from the channels; and
removing the plurality of seals from the honeycomb body.

15. The method of claim 14, wherein the step of removing the plurality of seals from the honeycomb body further comprises dissolving the plurality of seals.

16. The method of claim 14, wherein the step of removing the plurality of seals from the honeycomb body further comprises at least one of oxidizing the plurality of seals and melting the plurality of seals.

17. The method of claim 14, further comprising:
contacting the honeycomb body with a cement mixture such that a second portion of the channels have a portion of the cement mixture therein.

18. The method of claim 14, wherein a liner is positioned between a substantially transparent container and the ultraviolet curable sealing mixture.

19. The method of claim 18, wherein the liner is flexible and substantially transparent.

* * * * *